F. E. VANDERCOOK.
SAFETY PIN MACHINE.
APPLICATION FILED FEB. 3, 1912.

1,203,161.

Patented Oct. 31, 1916.
11 SHEETS—SHEET 1.

Fig. 1.

Witnesses:
Wm. A. Courtland
H. Alfred Jauke

Inventor
Frank E. Vandercook
By his Attorney

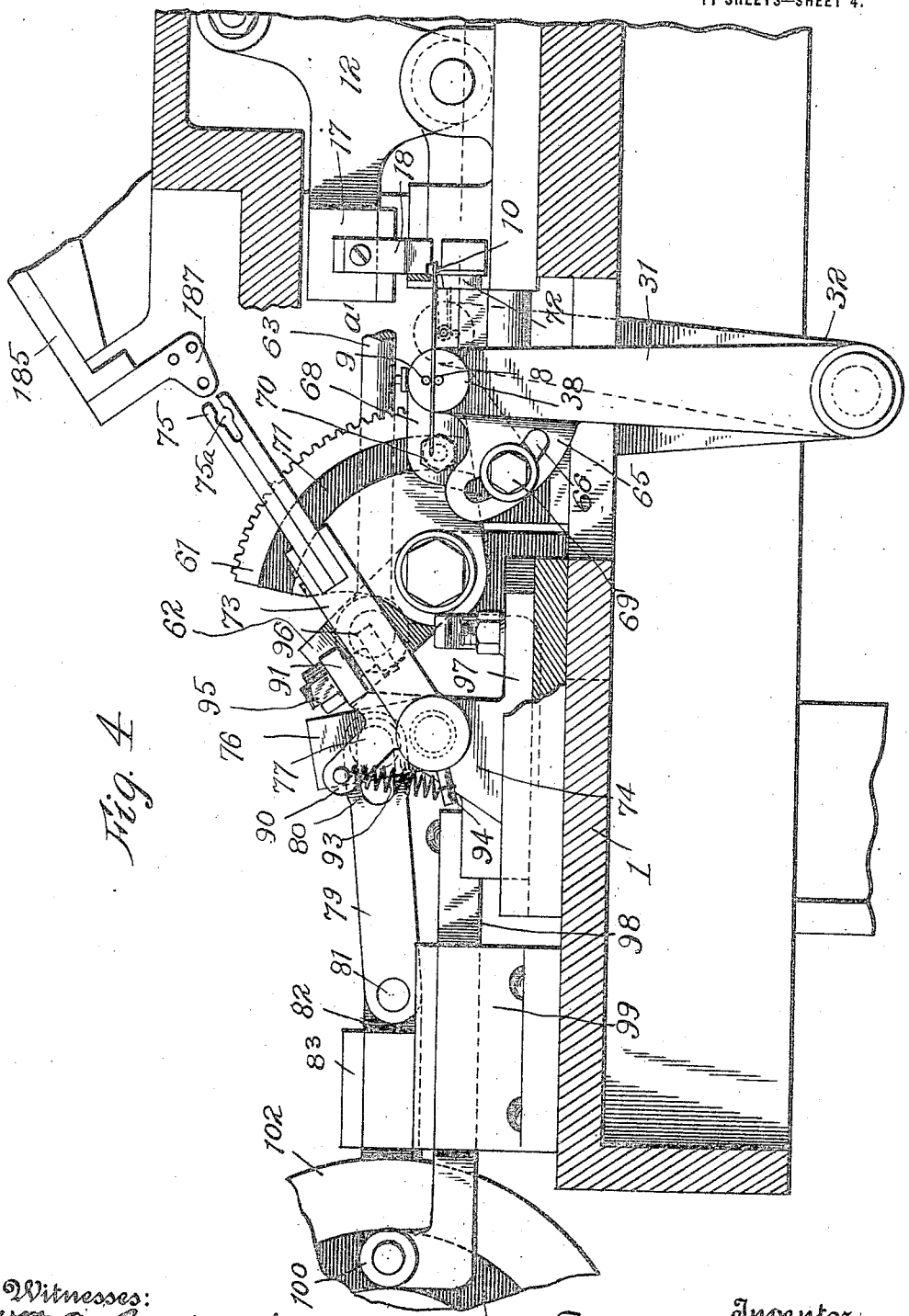

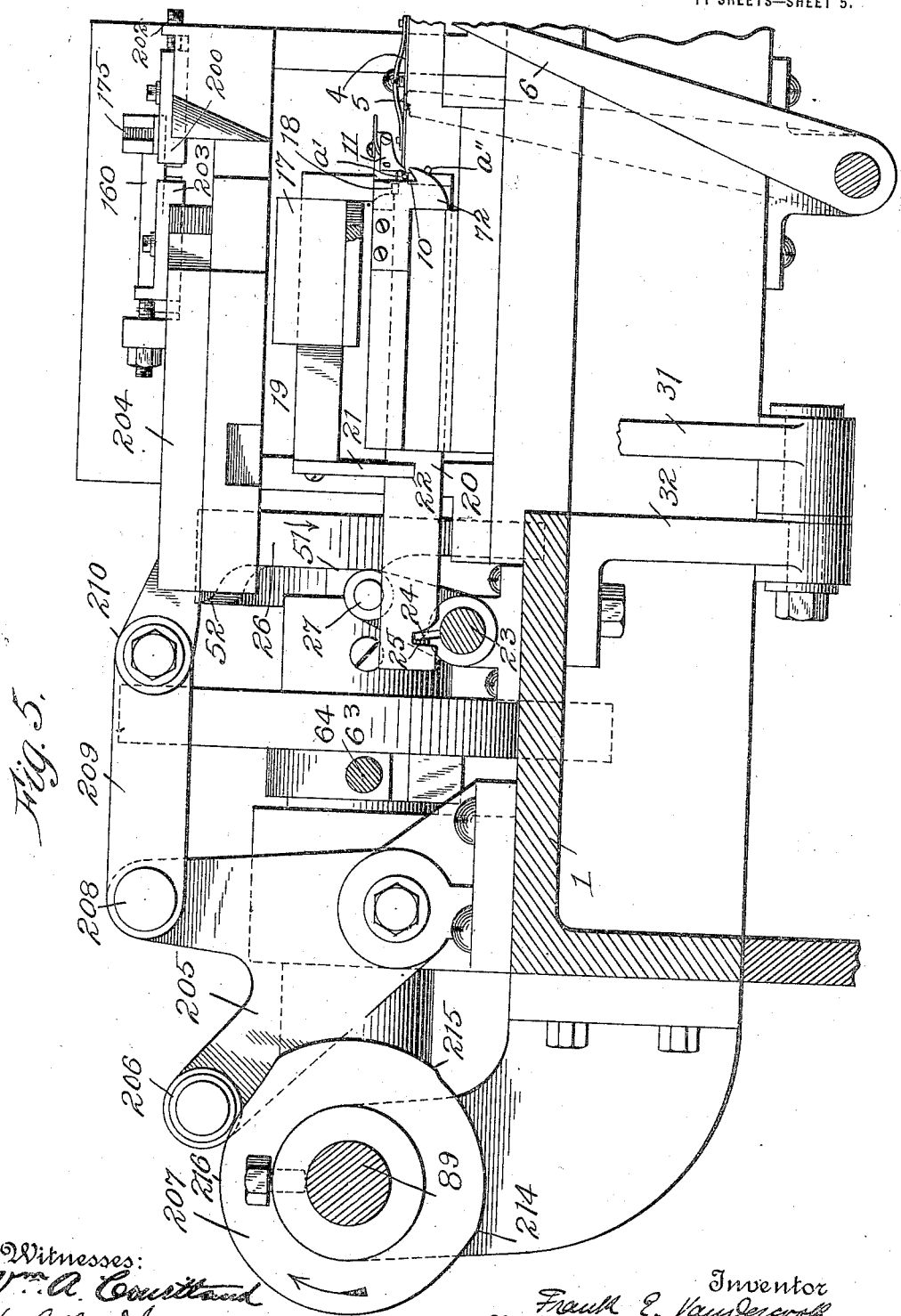

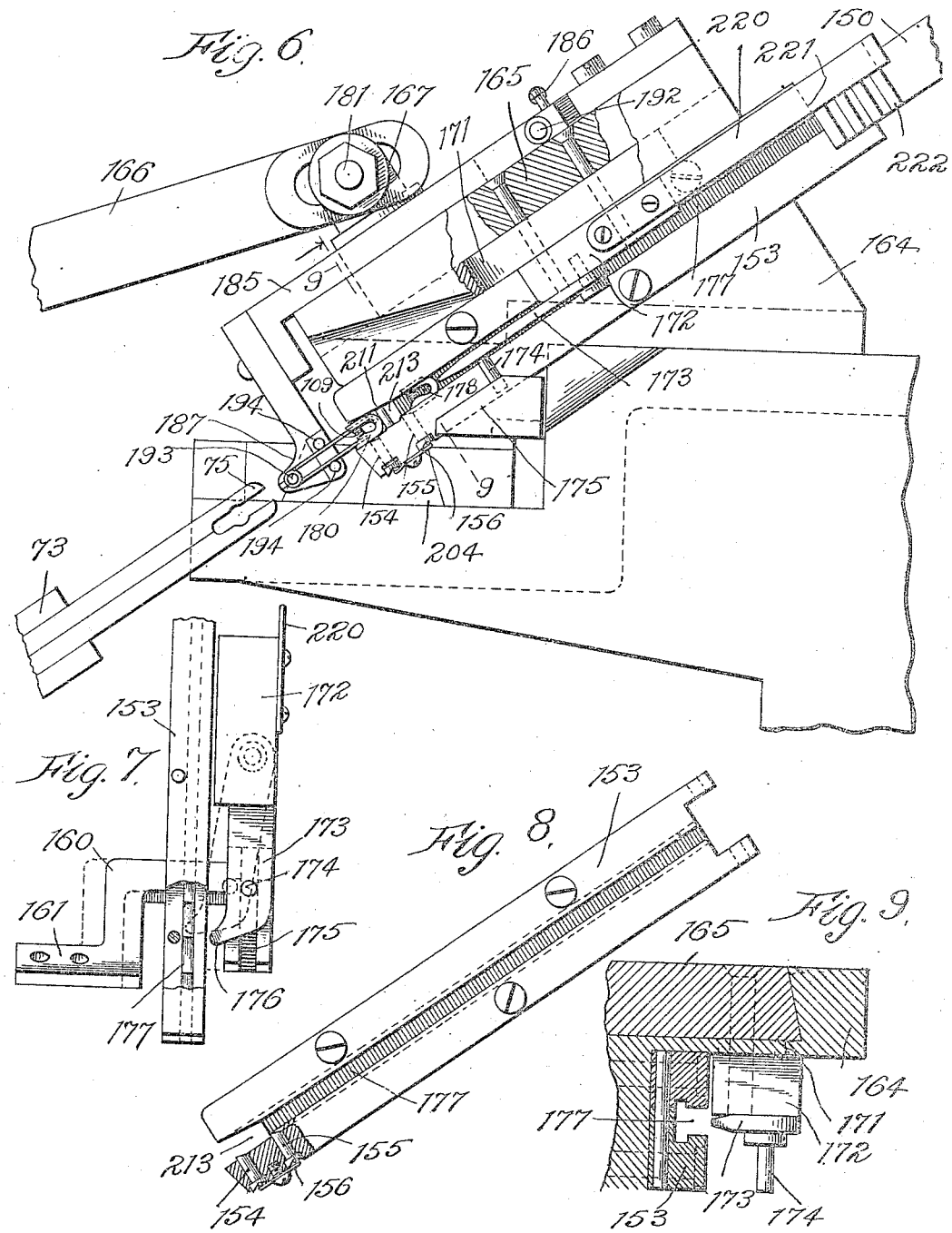

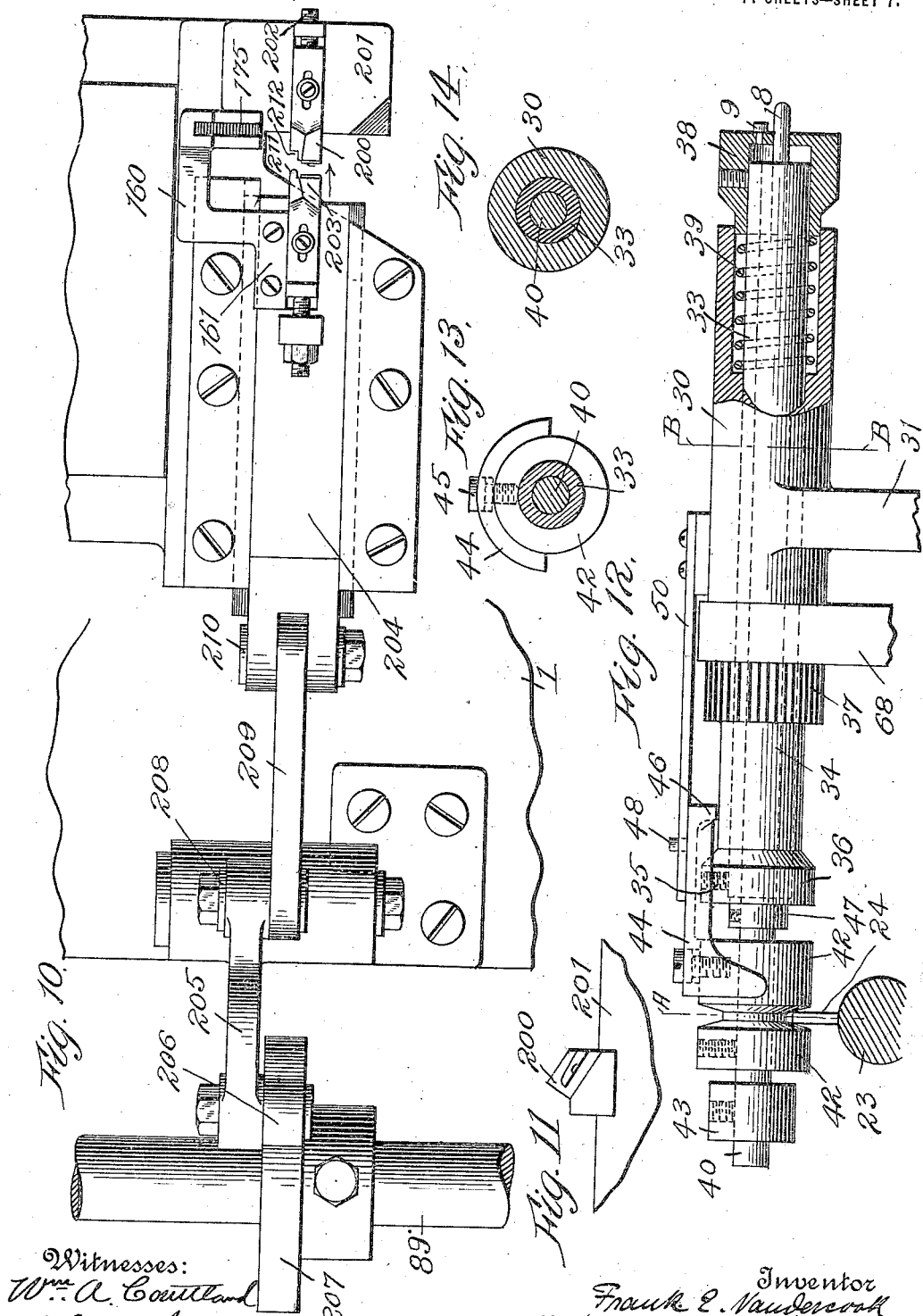

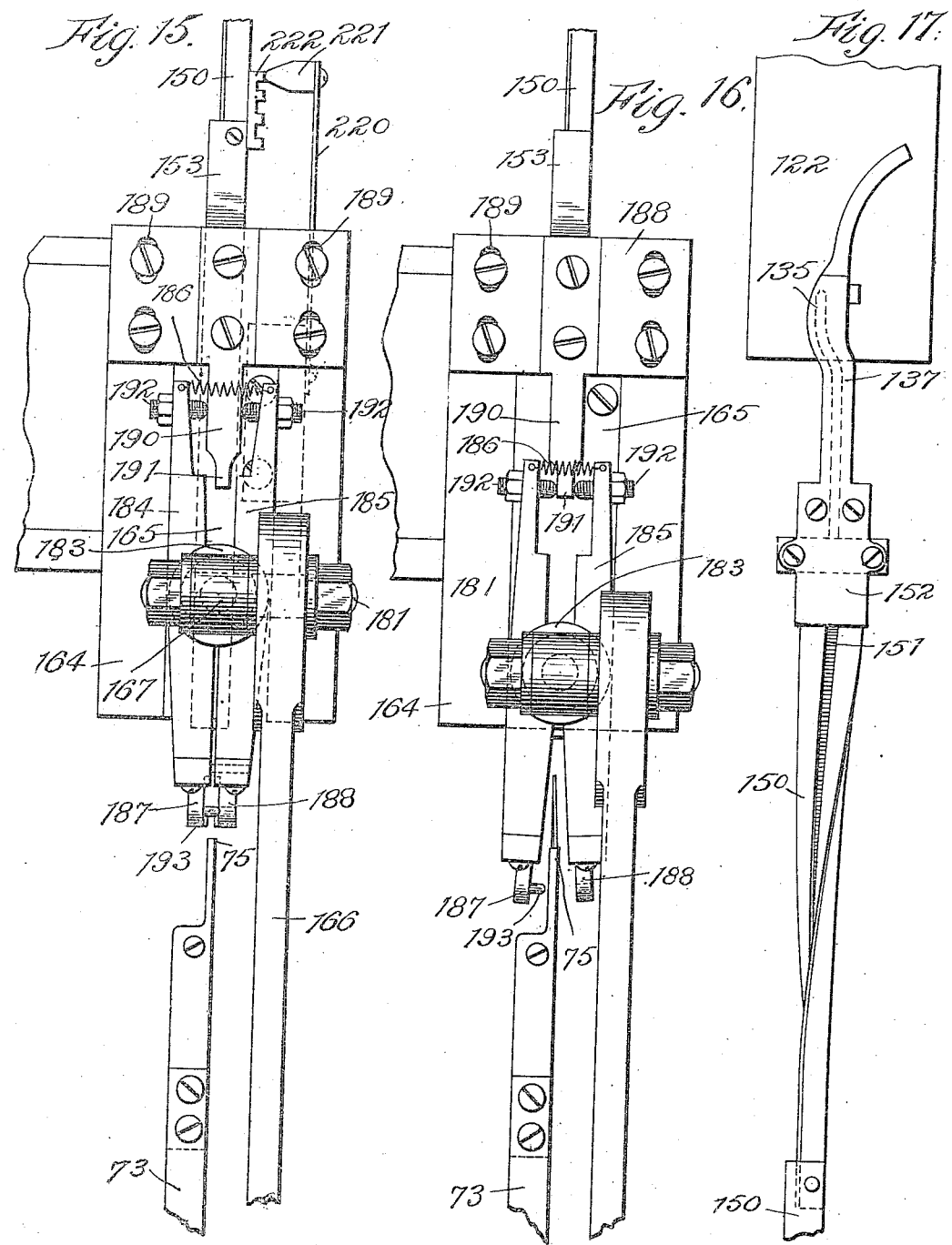

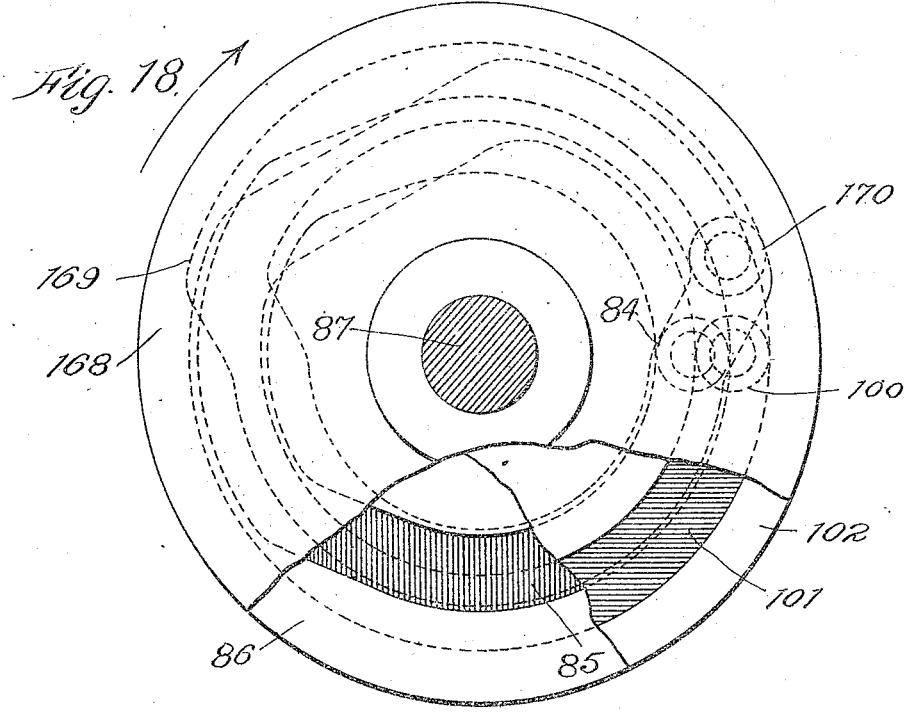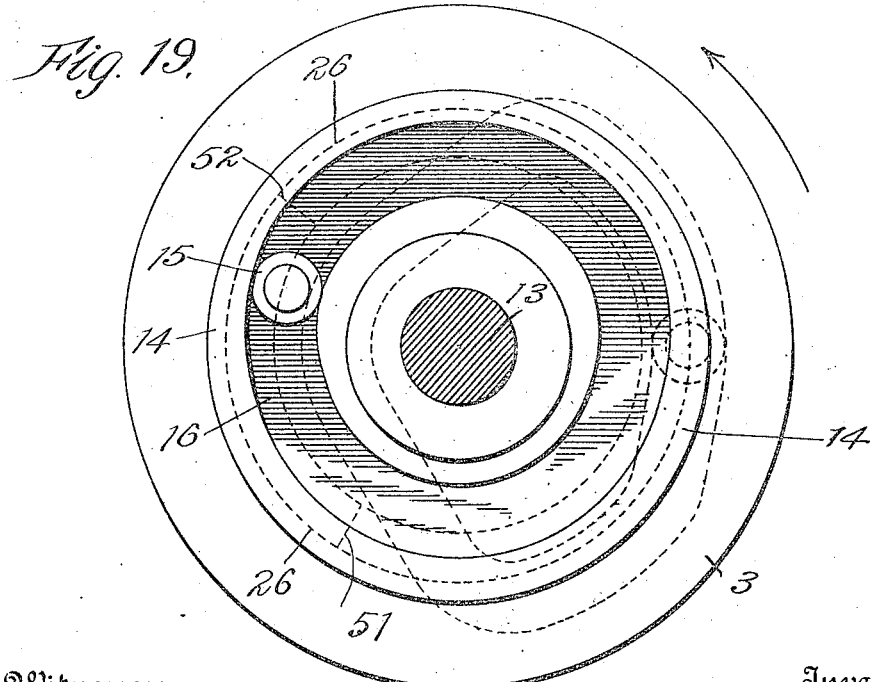

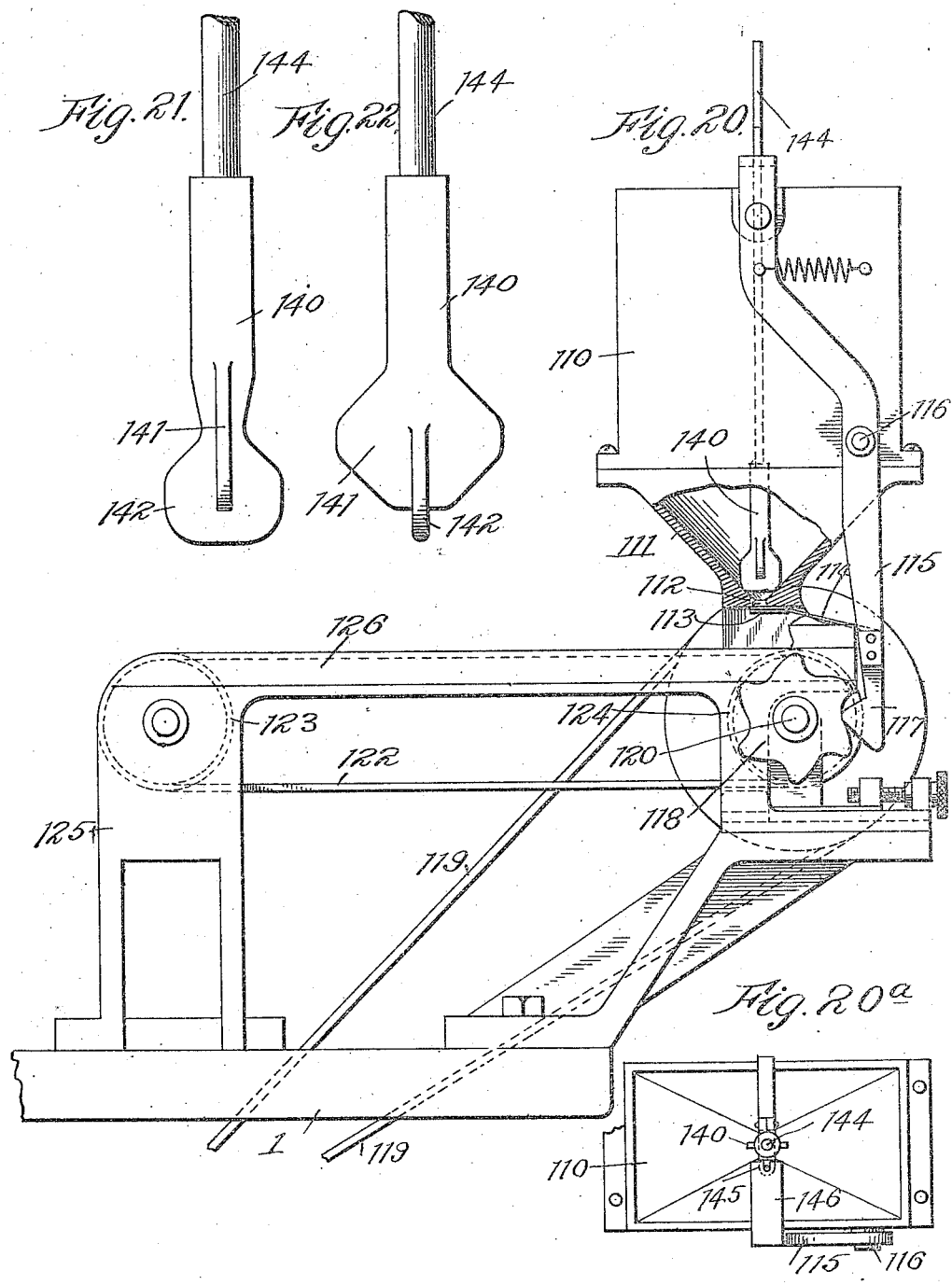

F. E. VANDERCOOK.
SAFETY PIN MACHINE.
APPLICATION FILED FEB. 3, 1912.

1,203,161.

Patented Oct. 31, 1916.
11 SHEETS—SHEET 11.

Witnesses:
Inventor
Frank E. Vandercook
By his Attorney

UNITED STATES PATENT OFFICE.

FRANK E. VANDERCOOK, OF WATERBURY, CONNECTICUT, ASSIGNOR TO OAKVILLE COMPANY, OF WATERBURY, CONNECTICUT, A CORPORATION OF CONNECTICUT.

SAFETY-PIN MACHINE.

1,203,161.      Specification of Letters Patent.      Patented Oct. 31, 1916.

Application filed February 3, 1912. Serial No. 675,120.

*To all whom it may concern:*

Be it known that I, FRANK E. VANDERCOOK, a citizen of the United States, residing at Waterbury, in the county of New Haven and State of Connecticut, have invented certain new and useful Improvements in Safety-Pin Machines, of which the following is a full and clear specification, the novel features of my invention being more particularly pointed out in the annexed claims.

My invention relates to a novel machine for manufacturing safety pins provided with caps attached to one leg of the pin, wherein after the twisting of the pin wire, during which the two legs of the pin are brought into closed or substantially parallel relation, such relation is substantially maintained while the pin is conveyed to the capping device and during the capping. Thereby I obtain the advantage over machines of this character heretofore known in the art to dispense with closing devices which act to close the pin after the cap has been attached to one leg in order to deliver the pin in closed position from the machine.

Figure 2:
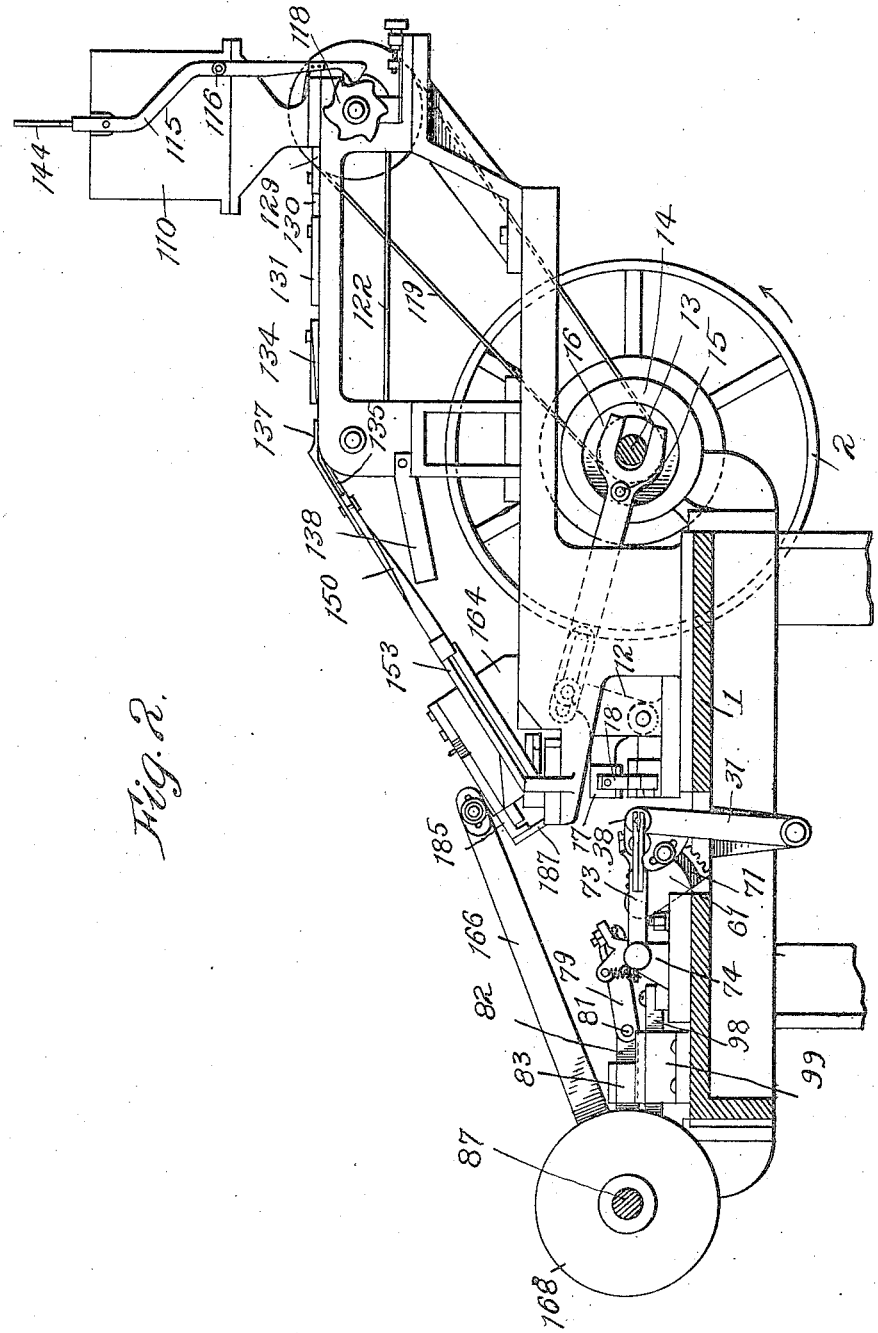
Figure 3:
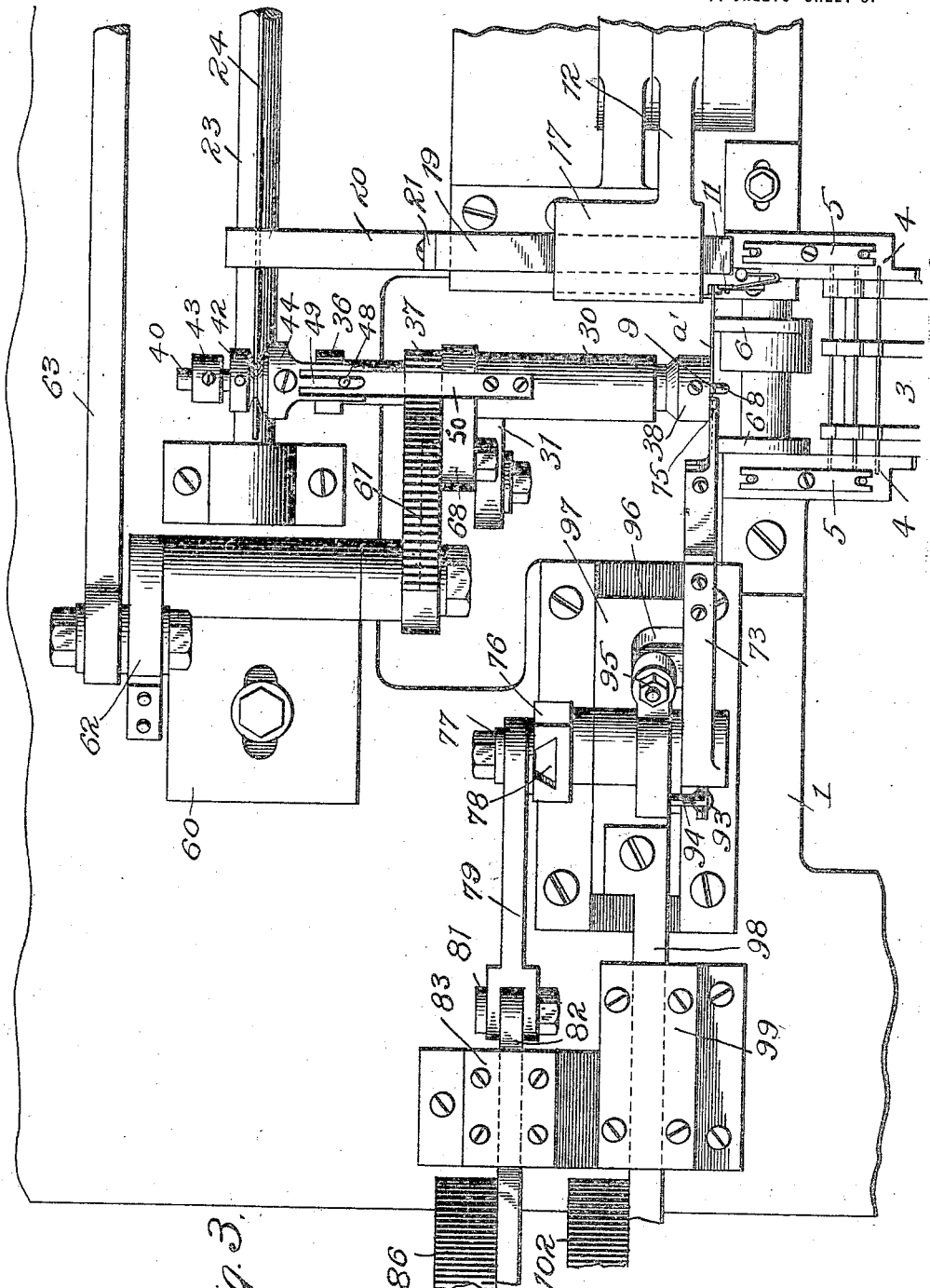
Figure 23:
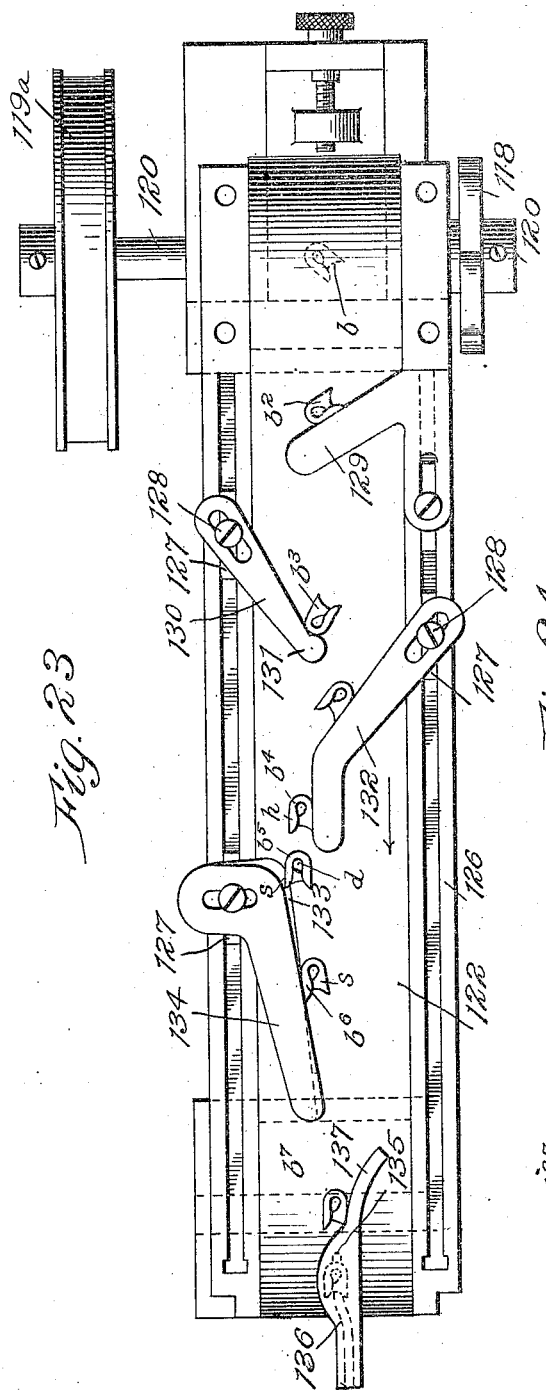
Figure 24:
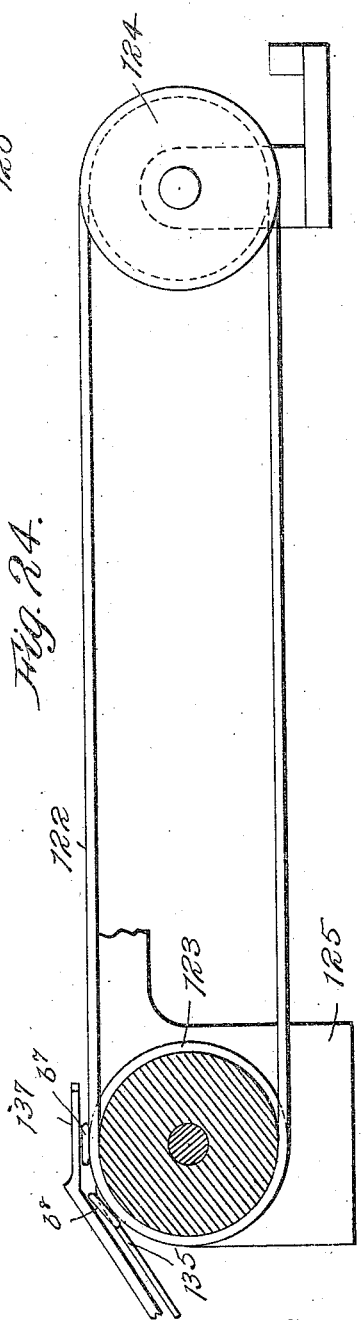

In the accompanying drawings which illustrate my invention, Figure 1 is a plan view of the entire machine, with the exception of the cap hopper and cap chute and the means for delivering the blanks to the twister. Fig. 2 is a side elevation of the machine including the cap feeding device. Fig. 3 is an enlarged plan view of the portion of the machine which contains the means for delivering the blank to the twister and for operating the twister head. Fig. 4 is an elevation of the portion of the machine shown in Fig. 3. Fig. 5 is a vertical section in larger scale on the line 5—5 in Fig. 1. Fig. 6 is a side elevation of the capping device with certain portions broken away. Fig. 7 is a detail plan view of the end of the cap chute and the cap feeding finger. Fig. 8 is a side elevation of the cap chute, the same as it appears in Fig. 6 showing certain details at the end of the chute. Fig. 9 is a detail sectional view on the line 9—9 in Fig. 6 showing the relation between the cap feeding finger and the cap chute. Fig. 10 is a plan view in larger scale of the cap crimping device. Fig. 11 is an end elevation of one of the crimping dies seen in the direction of the arrow in Fig. 10. Fig. 12 is a side elevation in larger scale of the blank twister. Figs. 13 and 14 are vertical sections of the twisting mechanism on the lines A—A and B—B respectively in Fig. 12 looking to the right. Figs. 15 and 16 are plan views of the blank conveying jaws and their operating mechanism, Fig. 15 showing the jaws withdrawn with a blank seized between them, Fig. 16 showing the jaws thrust forward and opened ready to seize a new blank. Fig. 17 is a plan view of the cap chute. Fig. 18 is a side elevation of the three cams, one behind the other, seen in the direction of the arrow 18 in Fig. 1. Fig. 19 is a side elevation of the cams at the opposite side of the machine seen in the direction of the arrow 19, Fig. 1. Fig. 20 is a side elevation of the cap hopper and its operating mechanism, the lower portion of the cap hopper being shown in section. Fig. 20ᵃ is a plan view of a portion of the cap hopper showing how the agitator is operated. Fig. 21 is a side elevation of the agitator located in the bottom of the hopper. Fig. 22 is another view of the agitator at right angles to that shown in Fig. 21. Fig. 23 is a plan view of the cap conveyer belt with the means for righting the caps and Fig. 24 is a side elevation of the conveyer belt shown in Fig. 23 partly in section.

In the following description of the machine I shall explain the mechanism according to its function in the different stages of the manufacture of the pin. These several mechanisms principally comprise: the blank feeding device to the twister and to the anvil; the blank-end bending device; the blank twister; the blank conveyer; the cap hopper; the cap separator; the cap chute; the single cap feeder; the blank and cap engaging device and the cap crimping device.

By the term "blank" I understand the straight pieces of wire sharpened at one end ready for twisting. The blank feeding device is only shown in the drawings as far as it is necessary to indicate to the reader where this device is located. Its construction is well known in the art and its detail description and illustration has been omitted in the present application.

Referring to Figs. 1 and 3, 1 is the main bed plate or table on which the entire machine is mounted, and power is supplied to the mechanism by suitable gearing to be described later on, which may be driven by any suitable means, for instance, by belt pulley 2. The blank feeding device so far as same is shown in Fig. 3 consists of a drum 3 on which the cut and sharpened wire blanks, for instance, as shown at *a—a*, are conveyed toward the machine between two guide plates 4—4 located at either end of the blank "*a*". These guide plates, of which one is shown in Fig. 5 in side elevation, are held on their support by springs 5 so that they are adapted to be lifted when a blank is pushed between the plate and its support. By suitable mechanism not shown here two rocking arms 6, shown in Fig. 5 in side elevation and in Fig. 3 in plan view, oscillate between feeding drum 3 and a point at which in Fig. 3 a blank *a'* is shown. From the illustration of arm 6 in dotted lines in Fig. 5 it will be noted that at their upper ends a small recess 7 is provided which faces the machine and when the arms swing back toward the drum a blank readily drops from the drum, which is operated in timed relation to the movement of the arms, into the small recesses 7 whereupon the arms swing toward the machine (in Fig. 5 to the left) and convey a blank between the guide plates 4 into the position in which the blank *a'* is shown in Figs. 3 and 5. In this position the blank *a'* is located midway between its ends between the two pins 8 and 9 of the twister head (Fig. 4) which will be described hereinafter. As shown in Fig. 4 the pointed end of the blank is at the left and the other end, which should receive a slight bend is located at the right on anvil 10. A small spring pressed latch 11 prevents the blank from sliding off the anvil when arms 6 recede to get a new blank from the drum.

The blank end bending device is constructed as follows: On bed plate 1 (Fig. 2) is mounted a bell crank 12 (shown in Fig. 2 partially in dotted lines) which is rocked by means of a cam 14 mounted on shaft 13. The connecting rod extending from bell crank 12 to the cam is provided with a cam roller 15 engaging in the cam groove 16 of cam 14, so that when shaft 13 revolves a rocking motion is imparted to bell crank 12. The end 17 of bell crank 12 contains a bar 19 slidingly disposed therein, so that it is capable of horizontal motion (Fig. 5) and at the right hand end of this bar hammer 18 is attached to it, which in Fig. 5 is shown laterally of and above anvil 10. Bar 19 is connected at its left hand end with another bar 20, running parallel to bar 19 and being slidingly disposed in the bed plate. The connection between bars 19 and 20 is made by a vertical member 21 which is rigidly attached to the end of bar 19, but which engages bar 20 in a slot 22 so that bar 19 to a certain extent may have vertical motion without interference with bar 20. On the bed plate is further disposed a rocking shaft 23 (Figs. 3 and 5), which extends transversely to bar 20 and to which a blade 24 is attached. This blade extends substantially throughout the whole length of the shaft as shown, and engages in a slot 25, provided at the left hand end of bar 20, as shown in Fig. 5. Thus when shaft 23 is rocked by means of a cam 26 and arm 27 in engagement therewith (Fig. 1) bar 20 is shifted horizontally from the left to the right or vice versa, and therethrough hammer 18, which is attached to the right hand end of bar 19 (Fig. 5) may be conveyed over the anvil and withdrawn therefrom. In Fig. 5 hammer 18 is shown shifted to the left of anvil 10. Now the timing between cams 26 and 14, which are both mounted on shaft 13, is such that rocking shaft 23 is first operated so that it brings hammer 18 upon anvil 10 after a blank *a* has been delivered with its blunt end on to the anvil as previously described. Thereupon cam 14 operates bell crank 12 so that the hammer 18 descends and thereby bends the blunt end of the blank *a'* downward. In this downward position the hammer remains and thus holds the blank at its blunt end during the twisting operation, which I will now describe.

The blank twister, the location of which in the machine is shown in Fig. 3, in plan view and in Fig. 4 in end view, is shown in detail in Fig. 12 and consists of a tubular guide 30 which is rigidly attached to an arm 31 pivoted on a hanger 32, extending below the table (Fig. 4). In guide 30 is journaled a tubular shaft 33, to which is attached at the left hand end (Fig. 12) a sleeve 34, by means of a set screw 35, extending through a collar 36 provided at the left hand end of sleeve 34. The right hand end of this sleeve carries gear wheel 37, as shown. Thus by operating gear wheel 37 rotary motion may be imparted to shaft 33. To the right end of shaft 33 is attached twister head 38 by means of a set screw as shown, whereby in the relative position in which the elements are shown in Fig. 12 this head extends a very short distance into guide sleeve 30. This latter sleeve is suitably widened inside to receive head 38 and a spring 39 which abuts at one end against a shoulder formed by the bottom of the widened sleeve portion and at the other end against the twister head so that normally the latter is held in the position shown wherein also gear wheel 37 abuts against arm 31, which thereby forms a stop for the twister head, so that it can not travel any farther to the right, as shown in Fig. 12. Within shaft 33 is disposed a shaft 40, which protrudes at the left hand end a suitable distance beyond collar 36 of sleeve 34, and which carries at its right hand end centering pin 8, which protrudes beyond the right hand end of sleeve 33, and also through twister head 38, as shown. Shaft 40 carries on its left hand end a grooved collar 42, which with its groove is adapted to engage the blade 24 of rocking shaft 23 referred to in the description of the blank bending device. The engagement of this collar with blade 24 is shown clearly in Fig. 3. A suitable distance from collar 42 to the left another collar 43 is mounted on and attached to shaft 40. Collar 42 carries a shield 44, which is attached to its periphery by a screw 45, which shield extends to the right beyond collar 36 and downward close to the periphery of sleeve 34, so that when collar 42 is shifted to the left the downward extension 46 of the shield will abut against collar 36 of sleeve 34 and pull the latter to the left. Between collars 36 and 42 a small collar 47 is attached to shaft 40, which forms a limiting stop for shaft 40 in its movement to the right, so that centering pin 8 can never protrude farther beyond the twister head 38 than shown in Fig. 12. Shield 44 also carries at its upper side a pin 48, which engages in a slot 49 of a plate 50, attached to the stationary guide sleeve 30 previously referred to. Thus collar 42 is prevented, together with shaft 40, from rotating but permitted to have longitudinal motion when blade 24 of rocking shaft 23 operates. The relative longitudinal movement between shaft 40 and sleeve 33 is such that when collar 42 is shifted to the left shaft 40 is shifted to the left so that centering pin 8 is fully withdrawn into the twister head 38. Thereupon nose 46 of shield 44 has arrived at collar 36 so that on further movement of collar 42 to the left, sleeve 34, and with it sleeve 33, carrying the twister head 38 is taken along to the left as far as rocking shaft 23 is permitted to rock. This operation of rocking shaft 23 which has been in part previously referred to in connection with the bending device is effected by cam 26, which is shown partially in full lines and partially in dotted lines in end view in Fig. 5. Arm 27, which is connected to shaft 23, and which is with its outer end in engagement with cam 26 is shown in Fig. 5 on the first step 51 of the two steps which are provided on cam 26 (see also Fig. 19). This has caused the rocking shaft to laterally remove the hammer from the anvil and also to throw collar 42 of the twister head, Fig. 12, part way to the left so that centering pin 8 is partway withdrawn into head 38 until it is about flush with the twisting pin 9, eccentrically attached to the face of head 38. When cam 26 rotates farther in the direction of the arrow shown in Fig. 5 arm 27 rides on to the second step 52 of the cam and thus throws collar 42 still farther to the left whereby centering pin 8 is entirely withdrawn into the head and then nose 46 in abutting against collar 36 throws the latter to the left and thus moves twister head 38 to the left.

Rotary motion is imparted to the twister head in the following manner: On table 1 is mounted a bracket 60, which carries rocking segment 61 (Figs. 3 and 4), operated by rocking arm 62, which is in turn in engagement with a connecting rod 63, operated by a cam 64 on shaft 13 (Fig. 1). From Fig. 4 it will be noted that segment 61 is not circular but elliptical and in Fig. 3 it is shown in engagement with the gear wheel 37 of the twister with its periphery of smaller radius. Arm 31 of the twister is provided with an ear 65, having circular slot 66, in which a screw-stud 69 travels, the stud being mounted on a plate 68, which can swing on sleeve 30, integral with arm 31 so that the angular relation of this plate to arm 31 can be adjusted by the screw stud 69. Plate 68 also carries on its far side in Fig. 4 a cam roller 70, which engages elliptical cam groove 71, which runs concentrical with the periphery of sector 61. By adjusting plate 68 in slot 66 the proper setting of roller 70 in groove 71 is possible. Now it will be noted that when sector 61 is rocked into the position shown in Fig. 2 the twister head 38 has been rotated as well as arm 31 rocked into the position in which head 38 is shown in dotted lines in Fig. 4. The gearing is thereby chosen so that the twister head in traveling to the position shown in dotted lines performs one revolution and one half.

From this description of the twister head and its operating mechanism it will now be understood that when by the blank feeding mechanism previously described a wire blank is fed into the position shown at $a'$ in Fig. 4 and when the blunt end of the blank has been bent down by the hammer and is being held thereby, the wire may be twisted by rocking segment 61 from the position shown in Fig. 4 into that shown in Fig. 2, whereby the head 38 twists the pointed end of the blank one turn and a half so that it will stand in parallel with the other end of the blank and point in the same direction. The twister head thereby follows the twisting motion by moving toward the blunt end of the blank into the position shown in dotted lines in Fig. 4, owing to the elliptical shape of sector 61. The longitudinal axis of the twister head is set angularly so relatively to the straight blank delivered to it that when the free end of the blank is twisted this end will travel past the other end of the blank on the far side in Fig. 4, so that thereby the free end is prevented from snapping off the twister pin 9. Before the free end arrives in its final position in parallel to the end held by the hammer, it strikes with the sharpened portion a curved plate 72 which leads this end (which has a tendency to travel on the far side of Fig. 4, as previously explained, and which is the left side in Fig. 5) on its upward travel to the right in Fig.

5. The pointed blank end is shown in end view at $a''$ partway up the curved plate 72. Upon completion of the twisting the pointed end has arrived at the upper end of curved plate 72 and owing to its tendency to bend to the left falls into the inwardly inclined notch and is thereby brought into vertical alinement with the other leg of the twisted blank. Curved plate 72 is shown in end view in Fig. 4 and the twisted pin shown in dotted lines with the pointed end resting in the notch of the plate. In this position of the twisted blank and of the twister head the blank conveyer commences to operate, which I will now describe.

The blank conveyer serves for conveying the twisted blank from the twister head upward to the mechanism by which the cap is attached to the blank. Its principal element is an arm 73 which is shown in Figs. 2 and 4 in side elevation and in Figs. 1 and 3 in plan view. This arm is pivoted in a bracket 74 as shown, for instance, in Fig. 4 and it rocks from the horizontal position upward to a fixed angle to the horizontal and downward again. In Figs. 1 and 2 the arm is shown in horizontal position in plan view and side elevation, respectively, and in Figs. 3 and 4 the arm is shown in elevated position in plan view and side elevation, respectively. The arm is provided at its outer end with two fingers 75 between which the blank is seized at the twister head and conveyed upward, to the capping mechanism in the manner which I will describe later on. For the present I shall first describe the mechanism by which the conveyer arm 73 is rocked up and down and also reciprocated at the same time to the left and right in Fig. 4. The rocking of the arm is obtained by means of crank arm 76, located on the far side of bracket 74 in Fig. 4 and fixed together with arm 73 on the same rocking shaft for which bracket 74 serves as a journal. In crank arm 76 a crank pin 77 is slidingly disposed as shown at 78, so as to properly adjust the exact angle through which arm 73 should rock. To crank pin 77 is attached a connecting rod 79 in such a manner that crank pin 77 can travel in a slot 80, provided in the forward end of the connecting rod. The rear end of the rod is pivotally attached at 81 to a sliding bar 82, guided in guide block 83, the rear end of bar 82 carrying a cam roller 84 shown in dotted lines in Fig. 18. This roller travels in a cam groove 85 of cam disk 86, which is shown in detail in Fig. 18. This disk 86 together with several other cam disks which I shall refer to later on is mounted on a shaft 87, driven by miter gears 88 from shaft 89, which in turn is driven by the pulley 2, as clearly shown in Fig. 1. In following in Fig. 18 the cam groove 85 in which cam roller 84 is disposed it will be noted that this groove imparts a one throw forward and backward motion at each revolution to sliding bar 82, and thus at each revolution of cam disk 86 conveyer arm 73 descends down to the horizontal position and in line with the center of twister head 38 and up again into the elevated position in which it is shown in Fig. 4. Bracket 74 carries an upwardly extending fork, the two arms of which are shown at 90 and 91. Arm 90 has attached to it a spring 93, the other end of which is attached to a stud 94, fastened at the hub of conveyer arm 73, through which spring the latter always tends to descend and thus always keeps crank pin 77 in the forward end of slot 80 of connecting rod 79. The other arm 91 of the fork carries an adjustable set screw 95 which abuts against a lug 96 integral with conveyer arm 73, as shown in Figs. 3 and 4, by which the upward throw of the conveyer arm is limited. Bracket 74 which carries the conveyer arm just described is slidingly mounted on table 1, as shown at 97, so that it can slide toward and away from the twister head. To the rear end of slide 97 is attached push bar 98 guided in guide block 99 and the rear end of this push bar carries a cam roller 100, which is located in a cam groove 101 of cam 102, likewise mounted on shaft 87 previously mentioned. In tracing cam groove 101 in Fig. 18 it will be noted that this groove like groove 85 of cam disk 86 is a one throw groove so that during each rotation of cam disk 102 slide 97 performs one complete operation, that is to say, it slides forward toward the twister head and returns.

The two cam grooves 85 and 101 are timed so relatively to each other that when disks 86 and 102 rotate in the direction shown in Fig. 18 roller 84 is nearest the center of its disk, or in other words in the low portion of the groove, which, with respect to the mechanism which it controls, indicates that sliding bar 82 is withdrawn the farthest to the left and thus conveyer arm 73 is elevated. Roller 100 in cam groove 101 is farthest away from the center of disk 102 at that time and, therefore, slide 97, which it controls is in its extreme forward position nearest to the twister head; thus conveyer arm 73 is elevated as well as thrust forward. If now the disks revolve in the direction indicated by the arrow in Fig. 18 roller 100 first strikes the lowest portion of its cam groove and thus slide 97 moves rearwardly and thereby conveyer arm 73 is withdrawn to the left in Fig. 4. Immediately thereafter cam roller 84, which controls the rocking of the conveyer arm rides up on to the high portion of its groove 85, so that sliding bar 82 is thrown to the right, in Fig. 4, which causes arm 73 to descend into the horizontal position in which its fingers 75 are in horizontal alinement with the center of the twister head 38. In following the cam grooves farther it will be noted that immediately after the conveyer arm has thus descended to the horizontal position roller 100 rides again up to the high portion of its cam groove, which causes slide 97 to move again to the right in Fig. 4 and thus bring the portion of the fingers 75 marked 75ᵃ in axial alinement with the centering pin 8 of the twister head when the latter is in its forward position, shown in Fig. 4 in dotted lines and in Fig. 2 in full lines, in which position the twister head holds the blank which it has just twisted. By this forward thrust of the arm 73 the two fingers 75 slide over both legs of the twisted blank whereby the twisted portion of the latter is placed into the portion 75ᵃ of the fingers. At this moment the centering pin of the twister and immediately thereafter the twister head is withdrawn in the manner described before and thereupon cam roller 84 descends from the high portion of its cam groove to the low portion by which sliding bar 82 is moved to the left in Fig. 4 and in turn arm 73 thrown up into the position shown in Fig. 4 with a twisted blank between its fingers and with the legs of the latter in parallel relation to each other. In this position the blank is taken from the fingers by the capping mechanism, which I will describe after I have made detailed reference to the manner in which the caps are fed from the bulk singly into a predetermined position in which the twisted blank is thrust into the cap, whereafter the cap is crimped on to the pin.

The cap hopper, the location of which in the machine, is shown at 110, in Fig. 2, is illustrated in detail in Figs. 20 and 20ᵃ. It consists of a hopper casing 110 into which the caps are delivered in bulk, the casing having a funnel shaped bottom 111 with an outlet 112 at its lowermost portion, of sufficient size and suitable shape to permit the passage of caps therethrough in any position in which they may be located. This opening 112 is normally held closed by a plate 113, which is attached by means of arm 114 to double arm lever 115, pivotally attached to hopper 110, as shown at 116. The lower end of this lever is formed into a blunt pawl 117, which is in engagement with a ratchet wheel 118, mounted on shaft 120, the latter being driven through a belt 119 from a pulley 121 on shaft 13 (Fig. 1). From this arrangement it will be noted that when ratchet wheel 118 revolves, pawl 117 rides up and down the teeth of the ratchet wheel whereby lever 115 is rocked so that in turn plate 113 is intermittently withdrawn and replaced on to opening 112 of the hopper; thus the caps contained in the latter will fall out one by one through the opening on to conveyer belt 122 stretched horizontally between pulleys 123 and 124, the latter being mounted on shaft 120, from which it is rotated. Pulley 123 is mounted in a frame portion 125 forming part of the skeleton supporting the several elements of the machine. The frame portion 125 is connected with the supporting structure of the hopper by means of two rails 126 one extending on each side of conveyer belt 122, as clearly shown in plan view in Fig. 23. Each of these rails contains an inverted T-shaped slot in which blocks 127 are disposed, into which screws 128 are threaded for clamping into position a number of guards which extend over the belt, as shown in Fig. 23. It will be noted from this figure that these guards are each of a different shape, each one, however, being inclined substantially toward the direction indicated by the arrow in which the belt travels.

When a cap is discharged by the hopper it lands on the belt at the point where in Fig. 23 cap "b" is located. The first guard 129 extends from its rail over the belt close to its surface beyond the middle of the belt so that when cap "b" encounters this guard it will be, for instance, thrown from the position in which it has landed on the belt into that shown at "b²" and gradually work along the edge of the guard until it slides off and is taken along by the belt, with its rounded end forward. Through the encounter with guard 129 the cap has also been shifted from the middle line of the belt closer to its right hand edge, seen in the traveling direction of the belt and being thus on that side of the belt it will encounter guard 130 extending from the right hand edge of the belt over the latter to about its middle line. This guard has a knob 131 at its end which when the cap has been gradually shifted with its rounded end first along the edge of guard 130 is encountered by this rounded end and serves for arresting the progress of the cap in this position. However the open portion of the cap protruding outwardly from the guard, as shown at "b³" is gradually thrown around by the movement of the belt so that it eventually points in the direction of the belt whereby the cap is gradually forced off knob 131 and taken along by the belt. At the same time the cap has been shifted again more toward the left hand side of the belt where it now encounters guard 132 along the edge of which it is shifted by the conveyer belt with its open portion forward. The cap in leaving guard 132 has been shifted again toward the right side of the belt still with its open portion forward. Caps thus placed on to the belt may assume two positions. One is shown at "b⁴" and the other one at "b⁵", the two positions corresponding with the two sides on which the cap may alight on the belt. The position shown at "$b^4$" is the correct position and a cap being thus thrown onto the belt with its thicker and heavier portion at "$h$" on the right hand side, in leaving guard 132 will glide along the curved edge 133 of guard 134 unaffected by the curved edge, on account of the thickness of the portion "$h$". On traveling forward along guard 134 it is shifted again substantially into the middle line of the belt on which it leaves the guard to encounter the rail by which it is conveyed away from the belt and which I shall describe presently. On the other hand caps which are lying and traveling on the belt with their wrong side up as shown by the cap "$b^5$" will encounter with their edge "$s$" the curved edge 133 of guard 134 by which edge "$s$" which is very light compared with the heavy edge "$h$" is gradually raised up so that the cap rolls over on to its right side, in which position cap "$b^6$" is shown. When a cap leaves guard 134 in the proper position as shown at "$b^7$" it is in line with rail 135, which is located very closely adjacent to the belt 122 where it starts on its bend around pulley 123. In the cap position "$b^7$", the deep recessed portion in the cap shown at "$d$" in cap position "$b^5$" being downward near the belt surface the cap will be caught by the rail in this recessed portion and fall over the rail into the position shown at "$b^8$" in Fig. 24. There the cap may remain until pushed forward by the subsequent cap landing from the belt on rail 135. This rail as may be seen from Fig. 23 has a slight bend at 136 in order to prevent too sudden a descent by the cap down the inclined portion of the rail, a portion of which is shown in Fig. 24. Moreover, in order to assure the catching of caps by the rail a guard 137 is placed over the latter, as clearly appears from Fig. 23. Of course, while in the journey of the cap from the point at which it lands from the hopper on the belt, to the point where it is pushed on to the rail, the cap has been described above so that it lands against the first rod 129 with its rounded portion forward and also lands with its rounded portion against knob 133 of guard 130, it may also happen that guard 130 by means of its knob 131 is not capable of turning a cap into such position, when it lands against guard 132 with its open end forward. Such caps then travel with their wrong end forward until they arrive at the point of rail 135 by which owing to this position they can not be engaged. Such caps when striking rail 135 tumble over and fall down over the side of the belt into a tray 138 (Fig. 2).

When the hopper 110 is filled with caps the great pressure bearing upon the caps located in the lower end of funnel 111 may cause such congestion that the caps fail to leave the hopper through opening 112 when plate 113 is withdrawn as described above. To facilitate the discharge of caps an agitator 140 is provided within the hopper and near opening 112. This agitator is shown in two views at right angles to each other in Figs. 21 and 22. It consists of two plates 141 and 142 set at right angles to each other, as shown in these figures and the agitator is attached to a shaft 144 extending upward beyond the upper opening of the hopper, and to the upper end of shaft 144 a horizontal arm 145 is attached, which is in engagement with the horizontal portion 146 of lever 115. When this latter lever is operated by a ratchet wheel 118, as explained above agitator shaft 144 is oscillated, whereby plates 141 and 142 keep the caps located in the lower end of funnel 111 constantly stirred up and thus facilitate the discharge of single caps through opening 112.

The cap chute 150, the location of which in the machine is shown in Fig. 2, and the detail view of which is shown in Fig. 17, is connected at its upper end to the downwardly inclined cap rail 135. It forms an inverted T-groove 151 into which the caps glide from the rail within the covered portion 152 of the chute. The upper portion of the chute, as shown at 151 is of such form that the caps are located therein with their flat side horizontally. The lower portion of the chute is twisted 90° so that the cap is turned into vertical position. The twist of the chute is clearly shown in Figs. 2 and 17. In this position the caps are delivered to the lower end 153 of the chute, which is shown in detail in Fig. 8 and in its connection with the single cap feeding mechanism also in Fig. 6. As will appear from Fig. 8 the lowermost end of the chute contains two pins 154 and 155, one placed behind the other, each pin being cut off at an angle at its inner end, which protrudes into chute 153 and both pins being held yieldingly in this position by means of a spring 156. When a cap glides down chute 153 it is arrested by pin 155, which even prevents further movement of the cap if more caps should gather back of the first cap. Further forward movement of the cap is effected by the single cap feeder, which I will now describe.

The single cap feeder is illustrated in different views in Figs. 6 to 9, and its location in the machine appears from Fig. 2. It consists of an arm 160 which is U-shaped and embraces chute 153, as shown in Fig. 7. The arm is fastened with the end marked 161 to a sliding block which operates the cap crimping die in a direction transversely to the chute which slide I shall refer to hereinafter more detailed. In the meantime it may be stated that arm 160 is capable of transverse motion from the position shown in full lines into the position shown in dotted lines in Fig. 7. The lower end of chute 153 is attached to a part of the machine frame 164 (Fig. 2) which is inclined toward the center of the machine and the upper portion of which serves as a guide for a slide, which oscillates in the direction longitudinally of the chute. The frame portion 164 is shown partially in Fig. 9 where also the manner is illustrated in which the chute 153 is attached to the underside of this frame. The slide guided by this frame is shown in larger scale in Figs. 15 and 16, which illustrate the blank and cap engaging device to be described hereinafter and which is operated by the slide.

The sliding member 165 is disposed between two dove-tailed ways 165ª provided in frame portion 164 and is oscillated longitudinally of the chute by means of a connecting rod 166 attached to a stud 167 rising from the slide as shown, for instance, in Figs. 6, 15 and 16. Connecting rod 166 is operated from a cam disk 168 (Figs. 1, 2 and 18) by having a cam roller 170 attached to its end adjacent to this cam disk which roller is disposed in a cam groove 169 (Fig. 18) the contour of which groove can be easily traced in this latter figure. When this disk, which is mounted on shaft 87, is rotated connecting rod 166 and in turn slide 165 which it controls is oscillated to and fro at each revolution of disk 168. To the under side of slide 165 which is exposed through a cut out portion 171 of frame portion 164 (Figs 6 and 9) is connected a block 172 which has pivotally attached to it a feeding pawl 173 (Figs. 6, 7 and 9). Moreover the forward portion of pawl 173 has a downward extending pin 174 attached to its underside, which engages in a slot 175 provided in the free portion of arm 160, previously mentioned with reference to Fig. 7, which portion extends in parallel to chute 153. Therefore, if as previously mentioned arm 160 is shifted to the left in Fig. 7 pawl 173 is rocked thereby into the position shown in Fig. 7 in dotted lines. Moreover if slide 165 is shifted by the mechanism just described in the direction toward the end of chute 153 pawl 173 is shifted toward the end of the chute with it. As will be noted from Fig. 7 the outer end of pawl 173 is pointed and inclined toward chute 153, and it is arranged at such a height that its pivotal support with its inclined finger 176 stands in line with the opening 177, of chute 153, which may be plainly seen from Figs. 6 and 9. The finger 176 is of such shape that it is capable of entering the open portion 178 of a cap located in the groove 177 of chute 153, and the position of the several elements just described relatively to each other is such that when slide 165 is withdrawn the farthest to the right in Fig. 6 finger 176 of pawl 173 stands approximately in line with the open portion 178 of the cap which is arrested in the chute by pin 156 previously described. If then arm 160 is shifted to the left (Fig. 7), and pawl 173 thereby thrown into the position shown in dotted lines finger 176 enters portion 178 of the cap arrested by pin 156. If thereupon slide 165 is shifted downwardly pawl 173 must follow this motion and, its end being in engagement with the cap, force the cap past the yielding pin 156 to the end of the chute, at which a cap is shown at 180, in Fig. 6. If then arm 160 is shifted again to the right (Fig. 7) pawl 173 releases the cap which is now held in place by yielding pin 154 and upon the shifting of slide 165 upward again pawl 173 is withdrawn with it and returned to its normal position shown in Fig. 7 in full lines. When the caps descend in chute 150 and enter chute 153 which leads them to the single cap feed it may occur that some caps through imperfection in manufacturing stick in the chute and thus clog the chute and prevent further feeding of caps to the single cap feed. In order to loosen such caps in the chute I have provided a hammer mechanism which is operated by slide 165, which operates the single cap feed, which I have just described. To the underside of slide 165 is attached a leaf spring 220 (Fig. 15) which carries at its free end a hammer 221, which passes over a ratchet 222 attached to the junction between chutes 150 and 153. Thus when slide 165 operates the hammer 221 passes at each stroke of the slide up and down ratchet 222 and produces slight concussions therein which are sufficient to shake loose any caps which might stick therein. When the cap is thus fed to the end of chute 153 as shown at 180 in Fig. 6 the blank and cap engaging device comes into action, which I will now describe.

It has already been stated with reference to the oscillating motion of block 172 of the single cap feeder that this block is operated from a slide 165 (Figs. 6 and 9) which is in turn operated by a connecting rod 166, from a cam disk 168, at the opposite end of the machine (Fig. 2). This slide carries the blank and cap engaging device, illustrated in detail in Figs. 15 and 16 in plan view in two different positions. A side view of it is also shown in Fig. 6. The foot of the stud 167 which carries the pivot pin 181 of connecting rod 166 serves as a pivotal support 183 for two levers 184 and 185, which are located midway between their ends on either side of pivot 183, so that when they rock thereon either their front ends will meet or when rocked in the opposite direction their rear ends will meet. A spring 186 is attached to the rear ends of these levers so that these latter ends always tend to join or be drawn together whereas the front ends forming the jaws 187 and 188 tend to open. As will be clearly seen from Fig. 6 the jaws of these levers are offset downwardly from the longitudinal axis of levers 184 and 185, whereby they are brought in line with groove 177 of the cap chute. On the rear portion of slide 165 is provided a plate 188, the position of which is adjustable longitudinally of the slide by means of slots 189, through which the screws holding the plate on to the slide pass. Plate 188 has a tongue 190, which extends from the middle portion of the plate toward the rear ends of the jaw levers 184 and 185, the tip 191 of the tongue being reduced in width over the remainder of the tongue, as clearly shown in Figs. 15 and 16. Through the rear end of each jaw lever passes a set screw 192, the inner end of which faces tongue 190 and the rear ends of the jaw levers being in horizontal alinement with the tongue 190, set screws 192 will glide on the edges of the tongue when slide 165 is oscillated. When the slide is withdrawn into its uppermost position shown in Fig. 15 set screws 192 have passed up to the rear end of tongue 190, so that the rear ends of jaw levers 184 and 185 are spread apart whereby jaws 187 and 188 at the other end of the levers are caused to close; whereas when the slide 165 is thrown downward set screws 192 following the contour of tongue 190 have passed on to the narrower edge 191 of the tongue through the action of spring 186, whereby jaws 187 and 188 open as shown in Fig. 16. Now the faces of jaws 187 and 188 are shaped so that they are capable of holding a twisted blank with its legs in substantially parallel relation to each other between them. As will be seen from Figs. 6 and 15 jaw 187 has a pin 193 at its outer end of sufficient length to engage with an opening in jaw 188 when the jaws are closed. Moreover the extreme outer ends of the two jaws are suitably shaped to hold between them, when closed, the coiled portion of the twisted blank, whereas the faces of the remainder portion of the two jaws come closer together and are capable when closed of holding the two legs of the blank between them. Moreover jaw 187 is provided with two pins 194, in such position that when a blank is placed between the jaws and held by the blank conveyer with its legs in substantially parallel relation to each other these legs will pass between the two pins 194 which pins, engaging with corresponding recesses in jaw 188 will, when the jaws are closed and the fingers 75 of the conveyer are withdrawn retain the blank legs in such parallel relation. This is clearly shown in Fig. 6. The conveyer arm 73, which has been described heretofore as rocking through an angle from the horizontal upward, is in this upward position in axial alinement with chute 153, so that when it carries a blank upward, as has been also described before, this blank is in axial alinement with the chute and any cap held in its end. The relation between arm 73 and the jaws 187 and 188 is such that when, as shown in Fig. 16, the jaws are thrust forward and downward, arm 73 will swing at its upward stroke with its fingers 75 between the open jaws.

If now slide 165 with its open jaws slides backward set screws 192 in riding up the wider portion of tongue 190 causes the jaws to close, whereby pin 193 of jaw 178 engages the coiled portion of the blank conveyed between the jaws by the fingers and thus the blank is pulled from between fingers 75 with its legs located between pins 194. On this backward and upward movement of the closed jaws the bent end, as well as, the pointed end of the blank is thrust into the cap shown at 180, in Fig. 6, in which the jaws are shown in their rearmost position, and thus the blank has been brought into engagement with the cap and it now remains to crimp the cap on to the bent end of the blank, which function is performed by the cap crimping device, as follows: This device is shown in elevation in Fig. 5, and in plan view in Fig. 10. It consists of two members, a stationary die 200, and a movable die 203. A face view of die 200 is shown in Fig. 11, seen in the direction of the arrow in Fig. 10. This die is mounted on frame portion 201 and it may be adjusted into proper position by means of set screw 202. The movable die 203 is mounted on a slide 204 which operates in a direction transversely to the cap chute 153, and in parallel with the sliding bar 19 which controls the hammer movement for bending the blank end, and which is located underneath the crimping device. Slide 204, as will be noted from Fig. 5 is operated by means of a bell crank 205, one arm of which carries cam roller 206, in engagement with cam 207, mounted on shaft 89 (Fig. 1). The other end of the bell crank is pivotally attached at 208 to a connecting bar 209, the other end of which bar is pivotally attached at 210 to slide 204. Thus when cam 207 operates in the direction of the arrow die 203 moves close to the face of die 200 and away from it. The two dies are located in transverse axial alinement with the cap shown at 180 in the end of chute 153, in Fig. 6, so that when the dies close they engage this cap between them and by their shape crimp the side of the cap, which contains the bent portion of the blank tightly around the blank and also shift the little tongue 109 of the cap into the middle so that, as is usual in safety pins the pointed end can be removed from the cap on either side of tongue 109. It has been previously described with reference to the means for holding the cap in the position shown at 180 in Fig. 6, that spring pressed pin 154, bearing against the cap merely holds it in place so as to prevent it from falling out of the chute. Now in order to prevent the cap from sliding out of position when the blank is thrust into it and the dies close, the movable member 203 of the latter is provided with a detent 211, which protrudes at the rear side of the die beyond its face, so that it will slide behind die 200 before the two faces of the die close upon each other. Die 200, for this reason has a suitable recess, as shown at 212, in Fig. 10. This detent 211 is of suitable shape to enter into the open portion 213 of the lower end of chute 153, as shown in Fig. 6, so that it thereby passes behind the cap shown at 180, in that figure, whereby the cap is thus prevented from sliding back when the blank, which is immediately thereafter thrust by the jaws toward the cap, enters the latter. Only then die 203 completes its operation of crimping the cap on to the blank. To obtain this two step motion cam 207 has two steps 214 and 215. When the jaws are far apart so that even detent 211 is withdrawn out of chute 153 and so that a cap is free to be conveyed by the single feed to the forward end of the chute, cam roller 206 rides on surface 216 of cam 207. Now when cam 207 continues to rotate roller 206 rides up the first step 214, which by the mechanism described before shifts slide 204 partway to the right in Figs. 5 and 10 sufficient to move detent 211 behind cap 180. Then the jaws 187 and 188 which have in the meantime seized a blank from the fingers, thrust the blank in to the cap, which now abuts against detent 211. In the meanwhile cam roller 206 arrives at step 215 of cam 207 and in riding up this step completes the shifting of slide 204, and die 203 to the right, which completes the crimping or attaching of the cap to the blank. Thence cam roller 206 rides down in one step to the circular cam surface 216 and thereby moves the dies far apart so that the jaws which still hold the blank between them can pull the cap, which is now attached to the blank, out of the chute on their downward and forward stroke. It may be mentioned here that the arm 160, which is shown in Fig. 7, and which controls the lateral movement of the cap feeding finger 173 is fastened to a slide 204, which controls the movement of die 203, as will clearly appear from Fig. 10. The movement of arm 160 of die 203 should be at all times together because detent 211 should, so to say, take charge of the cap delivered by the finger to the end of the chute immediately when the tip 176 of finger 173 is withdrawn from the cap, as has been previously described.

The operation of the entire machine is shortly as follows: After a straight blank has been delivered between the two pins 8 and 9 of the twister head and its blunt end is properly located on anvil 10, over which the hammer 18 is moved in the meantime, the hammer descends and bends this end, as described. Thereupon the twister commences to rotate in the direction of the arrow (Fig. 4) and at the same time to move toward the hammer and anvil into the position shown in dotted lines, thereby twisting the pin one turn and one half midway between its ends and eventually landing the pin point over curved plate 72, in the notch at the upper end of this plate. During this time conveyer arm 73 has been withdrawn rearwardly in elevated position and is lowered to the horizontal position, which brings its fingers 75 into alinement with the twisted pin. Now the arm is thrust forward and causes its fingers to slip over the pin. Thereupon the centering pin 8 of the twister is withdrawn and then the twister head is withdrawn in the manner described and also hammer 18 is lifted and withdrawn to the left (Fig. 5) so that arm 73 with a blank between its fingers has a clear sweep upward to carry this blank between jaws 187 and 188 of the blank and cap engaging device, which jaws have been previously thrust downward and opened to release the previously capped blank. The jaws now close and recede at the same time, engaging the blank presented in the manner described before, and on this rearward motion pull the blank from the fingers and thrust it into the cap which has in the meantime been moved down to the end of the chute by means of single feeding finger 173 of the single cap feed. During this time the crimping dies are wide open. Then the dies partially close removing finger tip 176 from the cap and moving at the same time detent 211 back of the cap. Now the jaws complete their rearward motion, and thrust the blank into the cap and thereupon the dies completely close and crimp the cap on to the blank. In the meantime another blank is twisted below and ready to be received by the fingers 75, which recede and descend immediately after the blank has been pulled from between them by jaws 187 and 188. After the completion of the crimping the jaws move downward again and open whereby the completed pin snaps off the three pins which formerly held it in closed position when it was thrust into the cap. The conveyer arm in the meantime takes charge in horizontal position of the blank, which was twisted while the upper blank was capped and thus the cycle of operations is repeated.

While I have shown a particular manner of twisting the blank and carrying it from the twister to the device, which provides the blank with a cap and while I have shown and set forth in detail a particular arrangement in which the caps are singly fed from the bulk and attached to the blank, I do not wish to limit myself to the particular detail features of the machine, the principal idea of which is the twisting of a blank and the capping thereof without changing the parallel relation of the two legs of the blank given to it by the twister.

What I claim is:

1. In a machine of the character described, the combination with means for bending and holding the end of a blank, of a blank twister adapted to twist a blank thus held and simultaneously following the length of the blank taken up by the twisting.

2. In a machine of the character described, the combination with means for bending and holding the end of a blank, of a blank twister adapted to twist a blank thus held and simultaneously following the length of the blank taken up by the twisting, said twister comprising a head for holding the blank, means for revolubly supporting the head, means for revolving the head, and means for moving said supporting means toward the holding means of the blank.

3. In a machine of the character described, the combination with means for bending and holding the end of a blank, of a blank twister adapted to twist a blank thus held and simultaneously following the length of the blank taken up by the twisting, said twister comprising a head for holding the blank, means for revolubly supporting the head and means for revolving and moving said head toward the holding means of the blank.

4. In a machine of the character described, the combination with means for bending and holding the end of a blank, of a blank twister adapted to twist a blank thus held and simultaneously following the length of the blank taken up by the twisting, said twister comprising a head having a centering pin and a twisting pin for holding the blank between each other during the twisting, means for revolving and moving said head toward the holding means of the blank and means for sucessively withdrawing said centering pin and said twisting pin when the blank is twisted.

5. In a machine of the character described, the combination with means for bending and holding the end of a blank, of a blank twister adapted to twist a blank thus held and simultaneously following the length of the blank taken up by the twisting, said twister comprising a head having a centering pin and a twisting pin for holding the blank between each other during the twisting, an eccentric gear wheel in mesh with a gear wheel of said twister for revolving and moving said head toward the holding means of the blank, means for sucessively withdrawing said centering pin and said twisting pin when the blank is twisted, means for operating said eccentric gear wheel and means for seizing the twisted blank before the said pins are withdrawn.

6. In a machine of the character described, means for twisting a blank into shape with its legs closed or in substantially parallel relation to each other, a capping device for engaging a cap with a closed blank and means for taking a blank from the twisting means and delivering it into said cap with the blank legs closed without turning over said blank.

7. In a machine of the character described, means for twisting a blank into shape with its legs closed or in substantially parallel relation to each other, a capping device for engaging a cap with a closed blank and a conveyer for taking from said twisting means a closed blank, carrying it into alinement with said capping device and means for taking said closed blank from said conveyer and engaging it closed with a cap in said capping device.

8. In a machine of the character described, means for twisting a blank into shape with its legs closed or in substantially parallel relation to each other, means for holding a cap in engaging position, a cap engaging device having two jaws adapted when closed to hold a closed blank between them, means for opening and closing and reciprocating said jaws toward and away from the cap holding means, a conveyer having an arm and two fingers, said arm adapted to swing through a predetermined angle to bring its fingers alternately into alinement with said twisting means and said jaws, to receive a closed blank from the twisting means and present it closed to said jaws, which close upon said blank and thrust it into the cap in said holding device and means for crimping said cap on to the blank.

9. In a machine of the character described, means for feeding caps in predetermined position, a chute for receiving such caps, means for arresting a cap near the end of said chute and a cap crimping device having a feeding finger for positively moving a cap from its point of arrest into position for engagement with a blank at the end of said chute, crimping dies adapted to laterally close upon a cap after engagement with a blank, said dies having a stationary and a movable member, the movable member having a detent sliding back of a cap in engaging position before the dies close and before the blank is engaged with the cap, to lock the cap in position during said engagement and during the crimping operation, and means for operating said dies and said finger in timed relation to each other.

10. In a machine of the character described, means for feeding safety pin caps comprising a hopper for holding caps in bulk, means for releasing caps singly from said hopper, a conveyer belt receiving such single caps, deflectors located in the path of the caps traveling on said belt for shifting such caps into predetermined position, and a rail for receiving the caps from said belt in such position, one of said deflectors having an edge whose surface is outwardly slanting toward the belt at the point where a cap first strikes this edge and gradually inwardly slanting toward the belt in the direction of travel of the caps to overturn caps which lie on their wrong side on the belt.

11. In a machine of the character described, the combination with means for discharging safety pin caps singly, a conveyer belt adapted to receive such caps to convey them to a predetermined point, means for laterally alining a cap on said belt during its forward travel to shift the desired end of the cap forward irrespectively of the side on which the cap lies, and means for laterally lifting and overturning a cap which lies on its wrong side before the cap reaches said predetermined point.

12. In a machine of the character described, the combination with means for discharging safety pin caps singly to a conveyer belt adapted to receive such caps to convey them to a predetermined point, deflectors extending from each side over the belt close to its surface and inclined in the direction of travel of the belt for laterally alining a cap on said belt during its forward travel to shift the open end of the cap forward irrespectively of the side on which the cap lies, and a likewise inclined deflector having an edge suitably shaped to overturn a cap lying on its wrong side and to simultaneously direct any cap toward said predetermined point.

13. In a machine of the character described, the combination with means for holding the blunt end of a blank, of a blank twister adapted to twist a blank thus held midway between its ends, and to simultaneously follow the length of the blank taken up by the twisting, said twister comprising a supporting sleeve, an inner sleeve rotatably and slidingly disposed therein, and a central core slidingly disposed in the inner sleeve, the inner sleeve carrying a twister head at one end provided with an eccentrically disposed pin, said core protruding centrally through said head and forming with said pin the two blank twisting elements, means for rotating the inner sleeve and simultaneously transversely shifting the twister toward the blank holding means, means for longitudinally sliding said core to withdraw it from the twisted blank, and means for shifting the inner sleeve to remove the head from the twisted blank.

14. In a machine of the character described, the combination with means for holding the blunt end of a blank, of a blank twister adapted to twist a blank thus held, midway between its ends, and to simultaneously follow the length of the blank taken up by the twisting, said twister comprising a supporting sleeve, an inner sleeve rotatably and slidingly disposed therein, and a central core slidingly disposed in the inner sleeve, the inner sleeve carrying a twister head at one end provided with an eccentrically disposed pin, said core protruding centrally through said head and forming with said pin the two blank twisting elements, means for rotating the inner sleeve and simultaneously transversely shifting the twister toward the blank holding means, means for longitudinally sliding said core to withdraw it from the twisted blank, and means connecting said inner sleeve with said core for shifting said sleeve by said core to remove the head from the blank subsequently to the withdrawal of the core therefrom.

15. In a machine of the character described, the combination with means for holding a cap in engaging position, of blank and cap engaging means comprising a pair of jaws and means to close and open said jaws to hold a closed blank between them and to release the same, and means for reciprocating said jaws toward and away from said cap-holding means to thrust a blank with both legs simultaneously into the cap.

16. In a machine of the character described, the combination with means for holding a cap in engaging position, of blank and cap engaging means comprising a pair of jaws adapted to open and close and to hold a closed blank between them, means for reciprocating said jaws toward said cap and simultaneously closing said jaws on a closed blank presented to it on their movement toward said cap to thrust said blank with both legs simultaneously into said cap, said reciprocating means causing said jaws to open on their movement away from said cap holding means and means for presenting a closed blank to said jaws.

17. In a machine of the character described, the combination with means for holding a cap in engaging position, of blank and cap engaging means comprising a pair of jaws adapted to hold a closed blank between them, said jaws being pivotally supported on a common pivot midway between their ends, means tending to hold said jaws open, means for reciprocating said jaws toward and away from said cap holding means, means for closing said jaws when reciprocating toward said holding means to seize a closed blank presented to it and thrust it with both legs simultaneously into said cap, said opening means moving said jaws apart on their return movement from said holding means to release the blank with the cap attached to it, means for attaching said cap to one of the blank legs and means for presenting a closed blank to said jaws to be engaged with said cap.

18. In a machine of the character described, the combination with a hammer and anvil for bending and holding the end of a straight blank, a twister adapted to twist the blank into shape with its legs closed while its end is held, a conveyer arm having fingers, means for sliding said fingers over the closed blank, means for withdrawing said twister from the closed blank, means for removing said hammer from the blank, means for rocking said arm holding the closed blank upward, blank and cap engaging jaws adapted to take a closed blank from said arm in upward position, means for holding a cap in engaging position to permit said jaws to thrust said closed blank with both legs simultaneously into a cap held in such position, crimping dies suitably operated to crimp said cap on to the bent leg of a blank, and means for operating said jaws to remove an engaged blank and cap from said cap holding means.

FRANK E. VANDERCOOK.

Witnesses:
W. H. THURSTON,
H. E. KNIGHT.

Copies of this patent may be obtained for five cents each, by addressing the "Commissioner of Patents, Washington, D. C."